United States Patent
Yao et al.

(10) Patent No.: US 10,341,360 B2
(45) Date of Patent: Jul. 2, 2019

(54) METHOD AND APPARATUS FOR USER AND ENTITY ACCESS MANAGEMENT FOR CODE SIGNING ONE OR MORE OF A PLURALITY OF DEVICES

(71) Applicant: ARRIS Enterprises LLC, Suwanee, GA (US)

(72) Inventors: Ting Yao, San Diego, CA (US); Xin Qiu, San Diego, CA (US); Jinsong Zheng, San Diego, CA (US); Patrick Dizon, San Diego, CA (US); Aye Myint, San Diego, CA (US); Annie C. Kuramoto, San Diego, CA (US); Reshma Shahabuddin, Poway, CA (US); Thomas J. Barbour, San Diego, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 208 days.

(21) Appl. No.: 15/450,424

(22) Filed: Mar. 6, 2017

(65) Prior Publication Data
US 2017/0257380 A1    Sep. 7, 2017

Related U.S. Application Data

(60) Provisional application No. 62/304,641, filed on Mar. 7, 2016.

(51) Int. Cl.
| | |
|---|---|
| *G06F 21/00* | (2013.01) |
| *H04L 29/06* | (2006.01) |
| *H04L 9/32* | (2006.01) |
| *G06F 8/61* | (2018.01) |

(Continued)

(52) U.S. Cl.
CPC .............. *H04L 63/126* (2013.01); *G06F 8/61* (2013.01); *G06F 21/602* (2013.01); *H04L 9/3247* (2013.01); *H04L 63/10* (2013.01); *G06F 21/645* (2013.01); *H04L 63/08* (2013.01)

(58) Field of Classification Search
None
See application file for complete search history.

(56) References Cited

U.S. PATENT DOCUMENTS 8,954,732 B1 *  2/2015  Watsen ................ H04L 9/3263
                                                            713/157
2011/0047374 A1    2/2011  Liu et al.

FOREIGN PATENT DOCUMENTS

| EP | 1770589 A1 | 4/2007 |
| WO | 2005/112340 A1 | 11/2005 |

OTHER PUBLICATIONS

EPO Extended European Search Report, RE: Application No. 17159595.2, dated Jul. 5, 2017.

* cited by examiner

*Primary Examiner* — Alexander Lagor

(57) ABSTRACT

A method and apparatus is provided for managing the eligibility of data signing in an online code signing system. The method is used by a plurality of data publishers in an online code signing system. The method includes defining, by an administrator of the system, a hierarchy of a plurality of entities, and managing, by an administrator of the system, eligibility to designate at least one of a plurality of users to access the at least one configuration entity to sign the data via a plurality of accounts and eligibility to designate at least one of a plurality of managers via owner account to manage user access to sign data for at least one model entity.

11 Claims, 11 Drawing Sheets

(51) Int. Cl.
*G06F 21/60* (2013.01)
*G06F 21/64* (2013.01)

METHOD AND APPARATUS FOR USER AND ENTITY ACCESS MANAGEMENT FOR CODE SIGNING ONE OR MORE OF A PLURALITY OF DEVICES

CROSS-REFERENCE TO RELATED APPLICATIONS

This application claims benefit of U.S. Provisional Patent Application No. 62/304,641, entitled "GENERIC ENTITY AND USER ACCESS MANAGEMENT FRAMEWORK FOR CODE SIGNING SERVICES," by Ting Yao, Xin Qiu, Jinsong Zheng, Patrick Dizon, Aye Myint, Annie C. Kuramoto, Reshma T. Shahabuddin, and Thomas J. Barbour, filed Mar. 7, 2016, which application is hereby incorporated by reference herein.

BACKGROUND

1. Field of the Invention

The present invention relates to systems and methods for signing data for use on devices, and in particular to a system and method for providing generic entity and user access management of code signing services.

2. Description of the Related Art

It is beneficial in some circumstances to provide data to devices which have already been distributed to end users (e.g. fielded devices). Such data may be needed to update the device(s) to newer configurations or to perform additional functions, to ameliorate software "bugs" or other issues, or to simply replace data already resident in the device that may have been compromised. Such data may include software instructions (e.g. code) update fielded devices by providing data such as software code to those devices remotely.

One of the problems with the remote downloading of such data to fielded devices is that the data may be from an unauthorized source. An entity providing the data to the fielded devices may pose as a legitimate source of the data, yet provide data that is designed to compromise the security or functionality of the device. For example, the user of the device may be mislead into believing that their device needs a software update in order to function properly, and may be provided a bogus uniform resource location (URL) from which to download the software update. If the user downloads and installs the software update from the bogus URL, the code that is actually downloaded may include a virus or other malware that negatively affects the operation of the device, perhaps compromising all of the data (including the user's private information) that was stored by the device before the infected.

To prevent the foregoing problems, code signing techniques can be used to digitally sign data such as executables and scripts. Such signatures confirm the identity of the author of the data and guarantee that the data has not been altered or otherwise corrupted since it was signed. Most code signing paradigms provide a digital signature mechanism to verify the identity of the author of the data or build system, and a checksum to verify that the data object has not been modified. Such code signing paradigms typically use authentication mechanisms such as public key infrastructure (PKI) technologies, which rely on data publishers securing their private keys against unauthorized access. The public key used to authenticate the data signature should be traceable back to a trusted root certificate authority (CA). If the data signature is traced to a CA that the device user trusts, the user is presumed to be able to trust the legitimacy and authorship of the data that is signed with a key generated by that CA.

Systems for code signing are known in the art. However, such systems do not provide a framework that allows different organizations or companies to structure their data signing permission needs as they see fit or to safely permit data signing by other independent organizations. For example, assume Company A produces a set top box that can use a chip that can execute software from Company 1 or Company 2. Company A may desire to establish a data signing framework that allows Company 1 to sign data that it installs into their set top boxes, without providing Company 2 with access to that data signing framework. Similarly, Company A may desire to establish a data signing framework that allows Company 2 to establish a data signing framework that excludes (or includes) Company 1. What is needed is a system and method that provides management of code signing services by generic entities. The present invention satisfies that need.

SUMMARY

To address the requirements described above, the present invention discloses a method and apparatus for managing the signing of data from at least one of a plurality of data publishers for use with one or more of an plurality of devices of an application platform, each device a member of a device family of the application platform, the data to be installed on the one or more of the plurality of devices according to a management model of the device family. In one embodiment, the method comprises defining, by an administrator of the system, a hierarchy of a plurality of entities, and managing, by an administrator of the system, eligibility to designate at least one of a plurality of users to access the at least one configuration entity to sign the data via a plurality of accounts. The plurality of entities comprises, in decreasing hierarchical order, an application platform entity, having a sole owner, at least one project entity for each application platform entity, the project entity comprising the device family, at least one model entity for each project entity, the model entity defining the installation of the data on devices associated with the model entity and at least one configuration entity for each model entity, the configuration entity defining the data to be installed on devices associated with the configuration entity. The plurality of accounts comprises an owner account of the application platform entity, the owner account issued only to the sole owner of the application platform entity and at least one participant account of the application platform entity or the at least one project entity. The owner account provides sole eligibility to authorize access the application platform entity, eligibility to permit authorization of access to any of the plurality of entities hierarchically below the application platform entity, and eligibility to authorize users associated with the owner account to access at least one configuration entity hierarchically below the application platform entity to sign the data to be installed on the devices associated with the at least one configuration entity. Further, like the owner account, the participant account provides eligibility to authorize users associated with the participant account and no other participant account to access at least one configuration entity hierarchically below the application platform entity or the at least one project entity, respectively, to sign the data to be installed on the devices associated with the at least one configuration entity.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Disclosed below is an online code signing system (OCSS) that supports standard code signing formats such as PKCS#1, PKCS#7 and other proprietary signing mechanisms. The OCSS also performs operations such as code encryption and decryption.

The OCSS offers a web portal for users to login and sign code images or other types of digital objects, generate digital signatures, encrypt code, and/or decrypt code manually and a web service interface for machine clients to do so programmatically. In order to provide such an automatic mechanism to sign code, a machine-to-machine interface is provided over Internet such that the Client/User machine can automatically connect with the OCSS to request code signing. The OCSS utilizes an architecture which consists of a client application, an OCSS frontend (front-end server), and an OCSS backend (back-end server).

Figure 1:
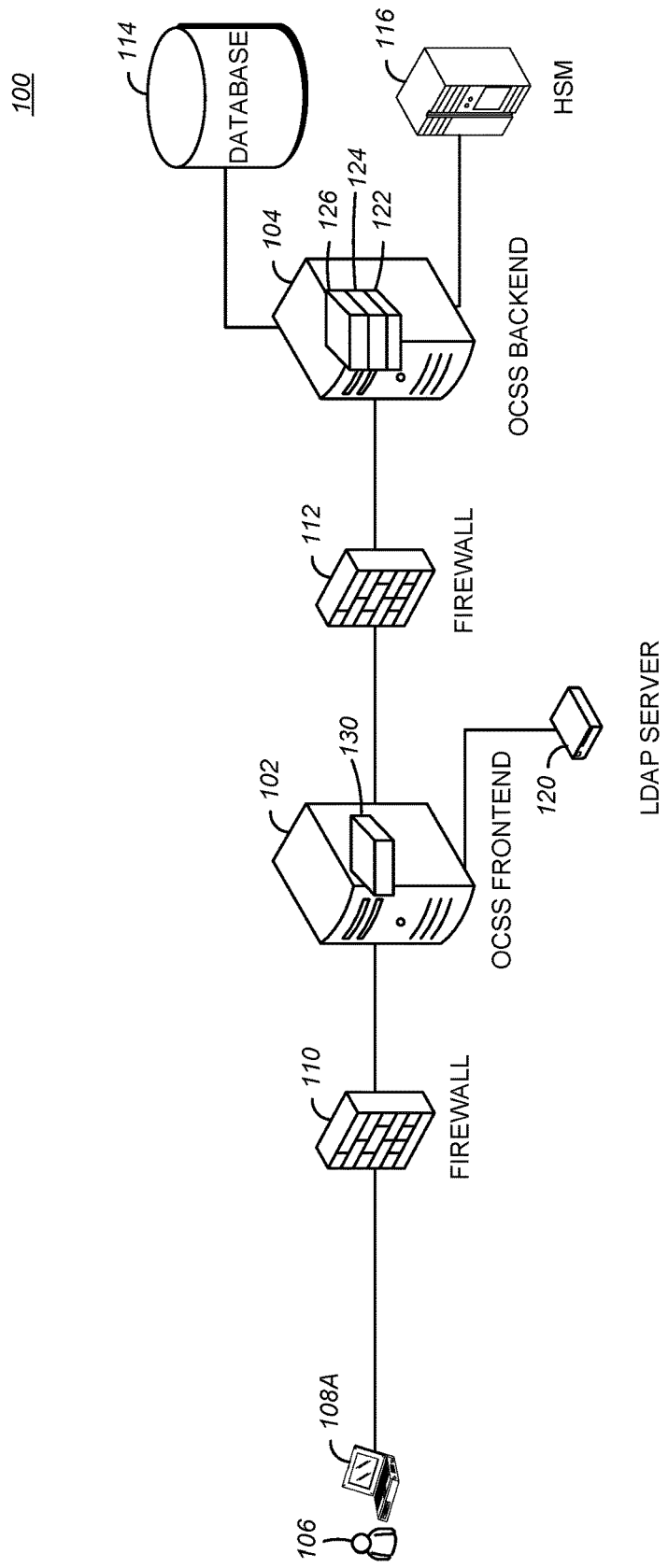
FIG. 1 is a diagram depicting one embodiment of an OCSS.

FIG. 1 is a diagram depicting one embodiment of an OCSS 100. The OCSS frontend 102 is a Graphic User Interface (GUI) layer that is the presentation layer for the OCSS 100. In one embodiment, the frontend 102 is hosted on a server that is behind a firewall 110 to protect against unnecessary or unauthorized access. The OCSS frontend 102 comprises a web portal interface 130 that implements the presentation (e.g. "look and feel") of functionality of the OCSS 100 on the user device 108A to an external user 106. In one embodiment, the web interface 130 is hosted in an Internet Information Service (IIS). Preferably, the OCSS frontend 102 does not enforce signing permissions, perform any signing or key generation activities, or define the hierarchy of the entities discussed below or how the access to such entities are managed. Rather, the OCSS frontend 102 controls access to the OCSS backend 104, and the OCSS backend 104 performs the functionality of enforcing signing permissions, performing signing or key generation activities, and/or defining the hierarchy of the entities discussed below and how the access to such entities are managed.

The OCSS frontend 102 also has access to a server operating according to the Lightweight Directory Access Protocol (LDAP) (hereinafter LDAP server 120) to authenticate valid user device 108A. The OCSS 100 maintains its own database of user 106 accounts, and the LDAP server 120 is used when a user is added to the system for the first time and a user account is created and stored in the OCSS database 114.

To access the OCSS 100, the user 106 must to specify user credentials, such as an LDAP password. Those credentials are used to validate every user session between the user and the OCSS frontend 102. The OCSS 100 forbids access to users 106 unless valid credentials are provided by the user device 108A and favorably compared to analogous information specified in database 114. Hence, only valid OCSS 100 users having credentials matching those stored in the database 114) are allowed to access OCSS 100.

The OCSS backend 104 is behind a second firewall 112 and provides protected access to the database 114 and the code signing keys that are stored in a hardware security module (HSM) 116. It is used to access the OCSS hierarchical entities discussed below and to look up user permissions for different code signing configurations and to perform all authorized crypto operations. The OCSS backend 104 connects to HSM 114 and using the HSM 114, performs operations such as code signing, encryption, and decryption. The OCSS backend 104 implements a plurality of software layers including, from the top software layer to the bottom software layer, an OCSS Windows Service layer 126, a Business Logic Layer (BLL) 122 and a Data Access Layer (DAL) 124.

The OCSS Window Service layer 126 is the heart of OCSS 100 and is comprised of a plurality of signing/generation operations that are supported by OCSS 100. Depending on what type of service is needed, a specific dynamically loadable library (dll) required for that service may be injected into memory to perform the operation.

The Business Logic Layer (BLL) 122 specifies which users 106 have access to the OCSS 100 and the conditions on which access is granted or revoked. The BLL 122 also takes care of other business logic such as updating audit logs and generating reports.

The Data Access Layer (DAL) layer 124 provides access to the database 114 and enables queries to access, add or remove entries in the database 114.

Manual Interactive Web Processes

Figure 2:
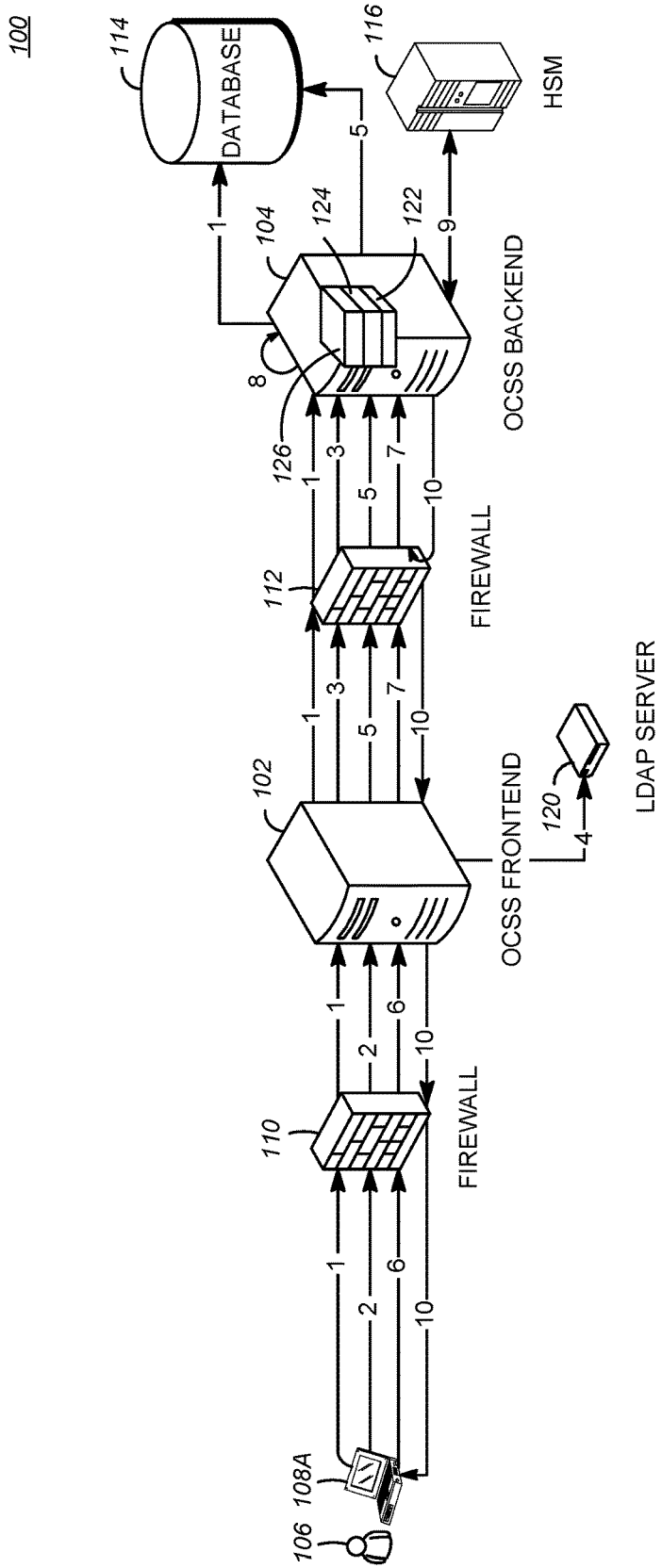
FIG. 2 is a diagram illustrating one embodiment of a manual process by which the designated users of the OCSS is used to sign data.

In a first embodiment, a manual code signing generation functionality is provided users 106. FIG. 2 is a diagram illustrating one embodiment of a manual process by which the designated human users of the OCSS 100 use to sign data.

Step 1: Before a user 106 can access the OCSS 100, an administrator of the OCSS 100 adds user's LDAP username to the OCSS configurations (further described below) in database 114 corresponding to software development projects the user 106 has been assigned.

Step 2: The user 106 interacts with the OCSS frontend 102 via a web browser executing on a user device 108A. Preferably, this interaction is performed using the secure hypertext transfer protocol (HTTPS).

Step 3: The OCSS frontend 102 utilizes appropriate services provided by the OCSS backend 104 over a simple object access protocol (SOAP) interface.

Step 4: When the user 106 logs in, the OCSS frontend 102 validates the user credentials (e.g. username and password) received from the user device 108A against data stored in the LDAP server 120 and if the user credentials compare favorably with the data stored in the LDAP server 120, the user 106 is allowed to access the OCSS 100. If not, the user 106 is denied access to the OCSS 100.

Step 5: Based on logged in user's credential, the OCSS frontend 102 invokes BLL 122 of the OCSS backend 104 to look up user permissions to determine which configurations the logged in user has access to, and presents only those configurations to the user 106.

Step 6: Using the user device 108A, the user 106 then selects one or more of the presented configurations and uploads an input/request file as well as other request parameters to OCSS frontend 102.

Step 7: The OCSS frontend 102 passes the uploaded input/request file, selected configuration, and operational details such as which signing key, signature algorithm, and/or digital signature format to use to OCSS backend 104.

Step 8: The OCSS backend 104, upon receiving request from the OCSS frontend 102, invokes the OCSS Window Service layer 126.

Step 9: The invoked OCSS Window Service layer 126 accesses the HSM 116 to get the keys that are needed to sign the data in the input/request file, and also retrieves configuration details from database 114. In one embodiment, the OCSS Window Service layer 126 also parses the input file. This is required because for some signing operations, the input file has to follow a particular format, and this operation verifies that the input file is using the proper format, then retrieves certain information from certain portion(s) of input file. The OCSS Windows Service layer 126 then performs appropriate operations such as code signing, encryption and decryption on the relevant portions of the input file. Based on these operations, the OCSS Window Service layer 126 generates an output response file having the signed data and other information.

Step 10: The OCSS Window Service layer 126 returns the generated output/response to the OCSS frontend 102. The OCSS frontend 102 generates a file from the generated output/response, which is forwarded to the user computer 108.

Automated Machine-to-Machine Interface

Another embodiment provides the automatic signing generation functionality to customers such that they can integrate this in their automated build process. In order to provide such a mechanism a machine-to-machine interface must be provided over Internet such that machine user 108B can automatically connect with our OCSS 100 Service to request code signing. The OCSS system 100 has two types of users: human users 106 and machine users 108B. Both may have "user" role in the system, while only human user can have "manager" or administrator role. The machine to machine interface is for a machine user 108B to request code signing programmatically.

Figure 3:
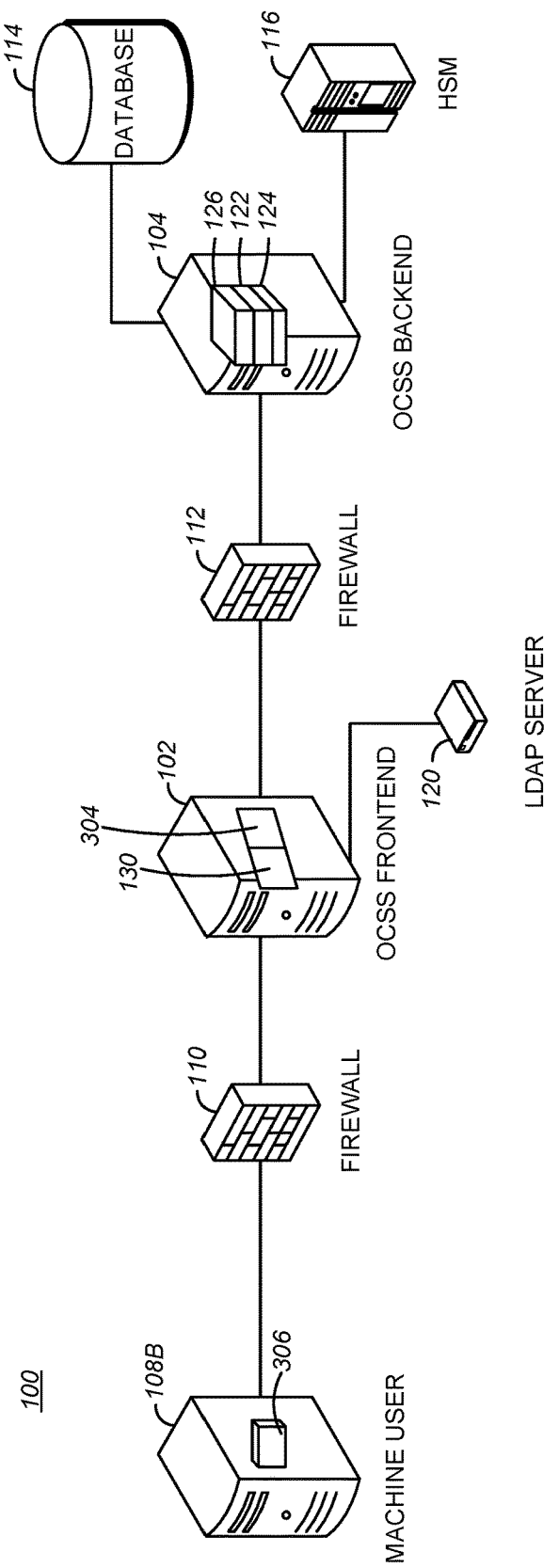
FIG. 3 is a diagram of an automated version of the OCSS.

FIG. 3 is a diagram of an automated version of the OCSS 100. As described below, the automated OCSS 300 uses same OCSS architecture depicted in FIG. 1, and can be used to support automated online requests from a client/machine 108B associated with an IP address. In this case, the IP address is treated as a virtual user of the OCSS 100 and can obtain the same kinds of permissions as are normally assigned to a human user 106.

The automated OCSS 100 introduces two new components: an OCSS client tool 306 implemented on an OCSS client 108B and an OCSS web service 304. The OCSS client tool 306 may be implemented in JAVA. The OCSS Web Service 304 provides an interface to the OCSS 100 infrastructure elements described above.

The automated OCSS 100 implements a machine-to-machine interface that comprises OCSS client tool 306, OCSS Web Service 304 and OCSS backend 104. OCSS backend 104 functionality is shared between the manual user access modes described with respect to FIG. 2 (e.g. graphical user interface or GUI), and the machine-to-machine interface described further below.

OCSS Client

The machine user 108B utilizes an OCSS client 306 that comprises an executable written in a general purpose programming language that can be executed in virtually any environment, such as JAVA.

The OCSS client 306 that is executed in the machine user 108B environment handles any pre and post processing of image files of the data to be signed so the machine user 108B does not need to know the details of the signing operations being performed on such data. The OCSS client 306 communicates with the OCSS Web Service 304 which runs on OCSS frontend 102.

OCSS Web Service

The OCSS web service 304 is hosted on OCSS frontend 102 behind firewall 110 to protect against unauthorized access. The OCSS web service 304 can be hosted in IIS and performs authorization and authentication functionality of OCSS 100 and does not include system and other crypto operation details. The OCSS web service 304 allows the OCSS client 302, through the OCSS frontend 102 to request code signing, encryption and decryption without a human interface or user 106 involvement.

OCSS Machine-to-Machine Process

Before an OCSS machine user 108B can access OCSS 110, the OCSS 100 administrator creates a user (machine) account in the LDAP server 120 and personalizes a hardware cryptographic token for that machine 108B. The hardware cryptographic token can be used for client machine 108B authentication in a number of ways.

Once the OCSS machine user 108B is authenticated, the OCSS Web Service 304 invokes OCSS backend 104 to retrieve machine authorization permission data that is used to determine whether the requesting machine account is authorized to perform the requested operation. Such authorization permission data is stored in the database 114.

Upon receiving the request from OCSS Web Service 304, the OCSS backend 104 invokes the OCSS Window Service 126, which accesses the HSM 116 to retrieve the keys required for the data signing process and also retrieve configuration details for the configurations that the client 302 is authorized to access or control. The OCSS backend 104 then optionally parses the input file provided by the machine user 108B above. The OCSS backend 104 then performs the appropriate action such as signing the code or other data in the input file, and/or encryption and decryption of data or keys. Based on the results of the action, the OCSS Window Service 126 generates an response having the output or results of the requested action. This output may comprise, for example, the signed data, and/or encrypted or decrypted keys. The OCSS Window Service 126 later returns this output to OCSS Web Service 304 executing on the OCSS frontend 102. The OCSS Web Service 304 returns the generated output to OCSS client 306. If no output is available, the OCSS web service 304 returns an error code.

The OCSS 100 is secured with multiple layers of protection against unauthorized access and protection of private keys including those used to sign the data. Such protection includes:

- User access is controlled by providing a hardware crypto token to the machine user 108B. The hardware crypto token contains a certificate and is associated with a username and password. A physical token tying the machine to an account (more secure than traditional username/password) may also be used.
- User authorization is role-based and very flexible, allowing different roles including administrator, manager, or user. Machine user 108B can only be assigned "user" role.
- The OCSS backend 104 is deployed in a secure area behind firewall 112 which allows access to the OCSS backend 104 only from the OCSS frontend 102 and in one embodiment, only on two web services ports, with access to a structured query language (SQL) server and the HSM 116 locked down.
- Private keys are stored in HSM 116, and those keys cannot be retrieved in clear form. A PKCS11 interface is used for code signing, encryption and decryption operations, thus never exposing the private keys in clear form.
- Critical operations are checked against authorization rules (stored in the database 114) and performed only if they are compliant with those rules.

Certificates are generated with the IP address of the machine user 108B as a unique user identifier in the CommonName attribute of each certificate. A client is not permitted to be behind proxy settings, so that the machine user 108B IP address is the actual address and not modified as seen by the server. IP addresses may be blocked from accessing OCSS 100 configurations and entities based on the geographic location associated with that IP address.

Management of Users

As described above, there is a need to provide a framework that allows different organizations or companies to structure their data signing permission needs as they see fit or to safely permit data signing by other independent organizations that publish the data to their customers. This is accomplished by defining a hierarchical organization of a plurality of entities within the OCSS, and managing eligibility to designate users to access those entities via accounts granting different eligibility status, as further described below.

An account represents the relation between a company and an OCSS entity and all of the children of the OCSS entity. An account is one of two account types, including an owner account type, and a participant account type. Granting an account provides eligibility to grant permission of a user to access an OCSS entity (and those hierarchically below that entity), but not permission itself. The permission is instead granted to the eligible user. A company may have multiple accounts for different OCSS entities, as further discussed below.

The top level OCSS entity (the application platform entity discussed below) can be owned by just one company through an owner account. This is enforced by the OCSS administrator granting an owner account to only one company. However, a company may have a participant account on the two top OCSS entity levels (the application platform entity and the project entity). This structure allows different OCSS entities to be accessible by multiple companies by the granting of the particular type of account (owner or participant).

Only users from an owner account can be assigned as a manager, and only users who's company has an account (either an owner account or a participant account) can be granted permission to sign data to be installed on devices associated with an entity associated with that account.

Figure 4:
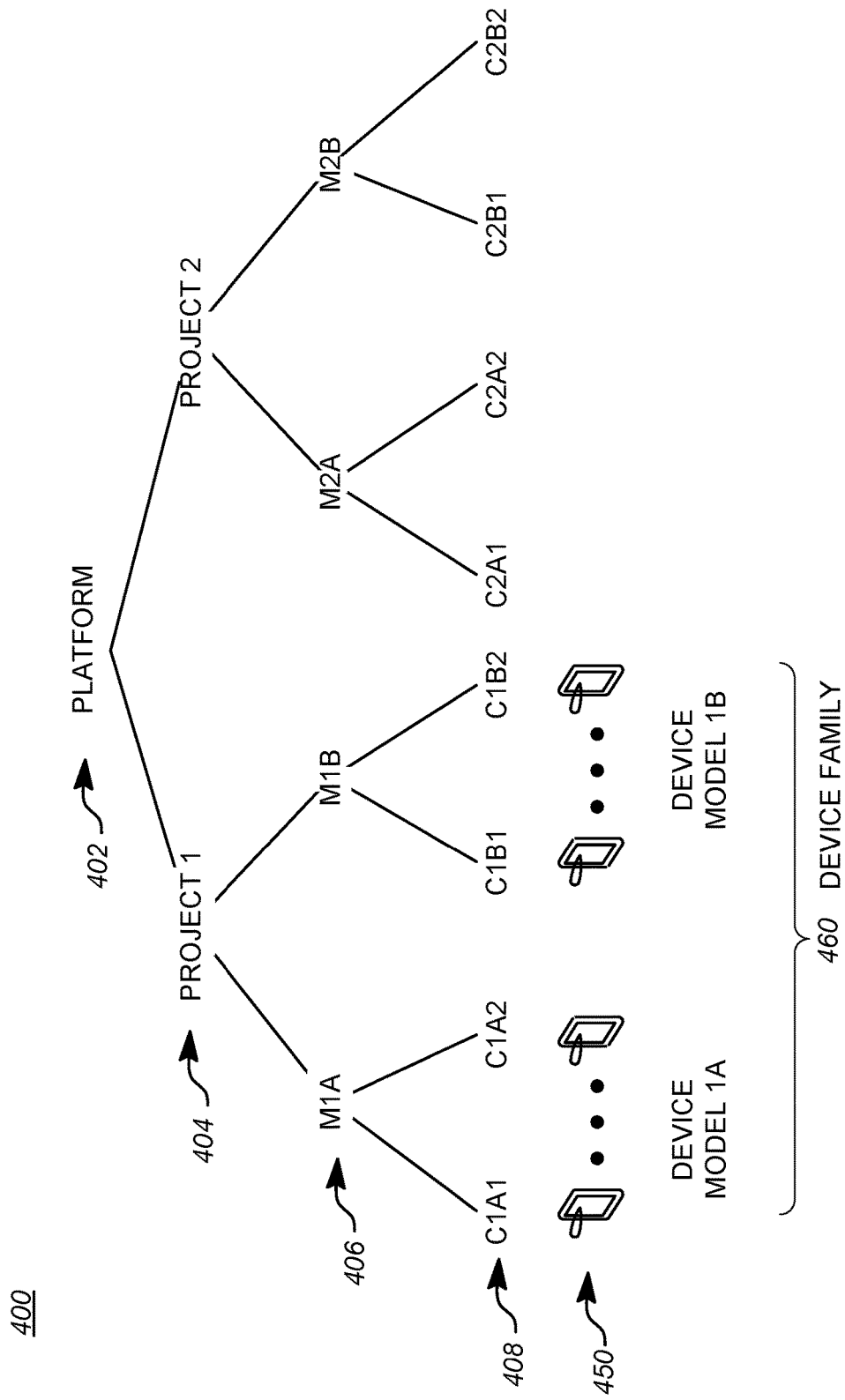
FIG. 4 is a diagram depicting a hierarchical organization (e.g. hierarchy) of a plurality of entities associated with data signing operations.

FIG. 4 is a diagram depicting a hierarchical organization (e.g. hierarchy 400) of a plurality of entities associated with data signing operations discussed above. The hierarchy 400 of entities includes, in decreasing hierarchical order, an application platform entity 402, at least one project entity 404 for each application platform entity 402, at least one model entity 406 for each project entity 404 and at least one configuration entity 408 for each model entity.

The application platform entity 402 may be evidenced by a corporate entity that produces a plurality of devices 450, for example, the assignee of this application, ARRIS, INC. A platform entity is defined as a highest hierarchical entity that organizes the code signing metadata/information for the fielded devices 450.

The project entity 404 typically comprises a family of devices 460 produced by the application platform entity 402. For example, the corporate entity ARRIS may produce a first family of devices 406 such as set top boxes (STBs) for receiving satellite broadcasts (one project entity) and another family of devices 460 such as STBs for receiving cable broadcasts. Familial or group bounds can be defined as desired, but are typically defined to include products with analogous or similar functional requirements or functional architectures. For example, the project entity may be defined according to the functionality or source of the chip used in the devices 450—for example, those that use one particular digital telecommunication processing chip family belonging to one project and another digital telecommunication processing chip family in another project entity.

The model entity 406 can represent the particular models of the devices 450, for example models of satellite STBs and cable STBs. In the context of data signing, the model designation defines the how the signed data is to be installed on the devices 450 associated with the model entity 406. For example, a particular model of satellite STB may use a different technique for installing new data or code than a different model of the satellite STB. In the context of signing, the configuration entity defines the data to be installed on the devices 450.

For example, the satellite STB of the aforementioned example may include bootloader code (code that executes upon a system reboot that uploads and executes code and scripts), as well as application code. The one configuration entity may represent bootloader code, while a different configuration entity represents the application code.

Figure 5:
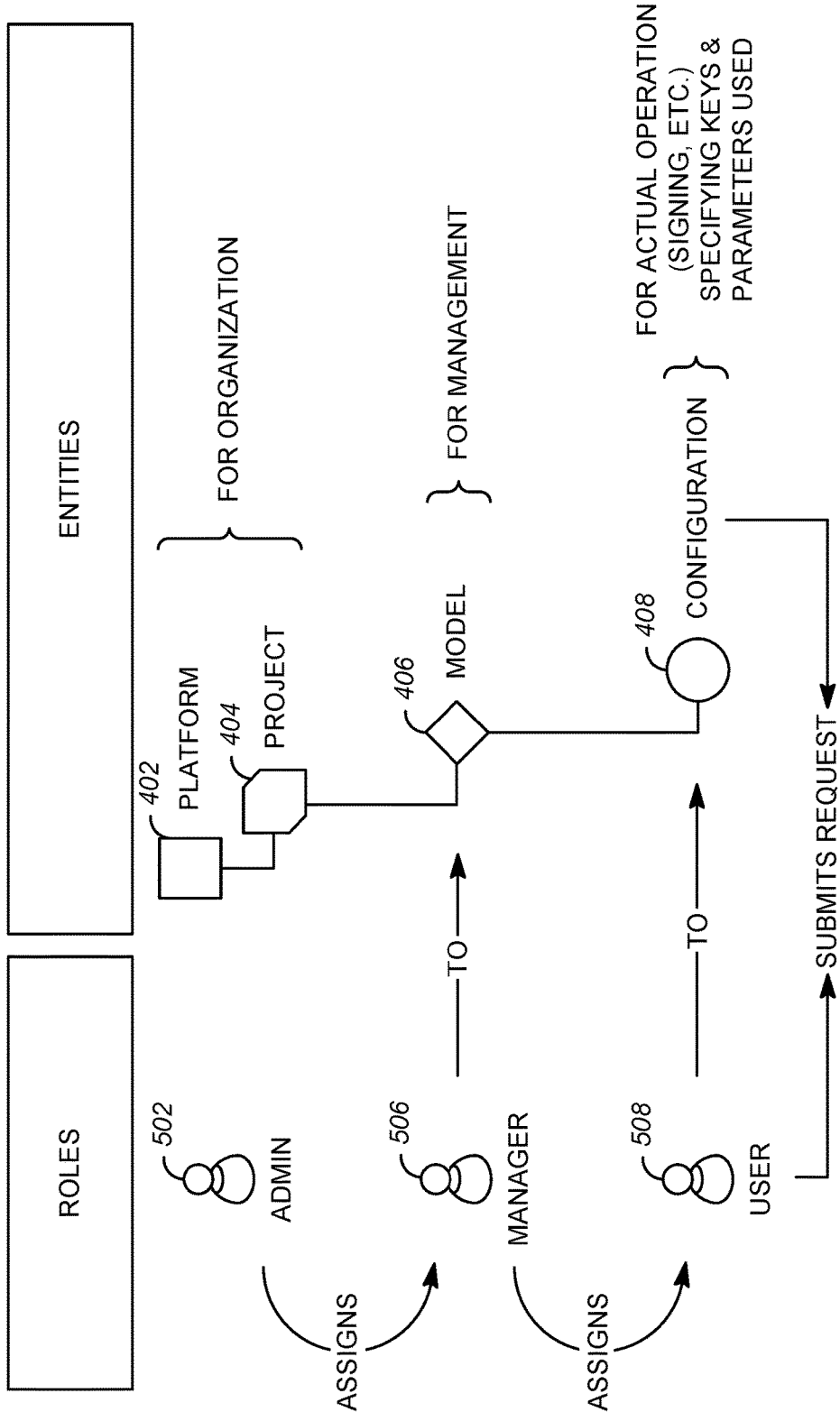
FIG. 5 is a diagram depicting the hierarchical organization and the user roles associated with those entities.

FIG. 5 is a diagram depicting the hierarchical organization 400 and the roles 502 associated with those entities. An administrator 502 of the OCSS 100 is identified, and that administrator 502 is authorized to define the hierarchy of the entities in decreasing order, an application platform entity, at least one project entity for each application platform entity, at least one model entity for each project entity, and at least one configuration entity for each model entity. The administrator 502 is also authorized to access and authorize access to any of the entities 402-408 and may also assign a manager role 406 to another individual to manage a particular model entity 506. This individual (hereinafter alternatively referred to as the manager 506 of the model entity 406) is thus a person having the manager role 506 with respect to the associated model entity 406. This manager 506 is authorized to designate or assign user roles 508 to particular individuals for a particular configuration entity 408. This individual (herein alternatively referred to as a user 508 of a particular configuration entity 408) is thus a person having a user role 508 with respect to an associated configuration entity 408. Importantly, managers 506 may not add users (this can be accomplished only by the OCSS administrator), but authorize users to perform certain roles.

The configuration entity 408 holds information regarding the specific code signing operation such as signing keys, signature algorithm, file format, and other security parameters. Managers 506 are normally defined to have access to this configuration information for all the configurations under the manager's managed entity (model 406). Users who has access to a configuration entity 408 can use it to perform the code signing activity according to the specified information/parameter but normally don't see the detailed information (e.g. keys, algorithms and the like) itself.

Figure 6:
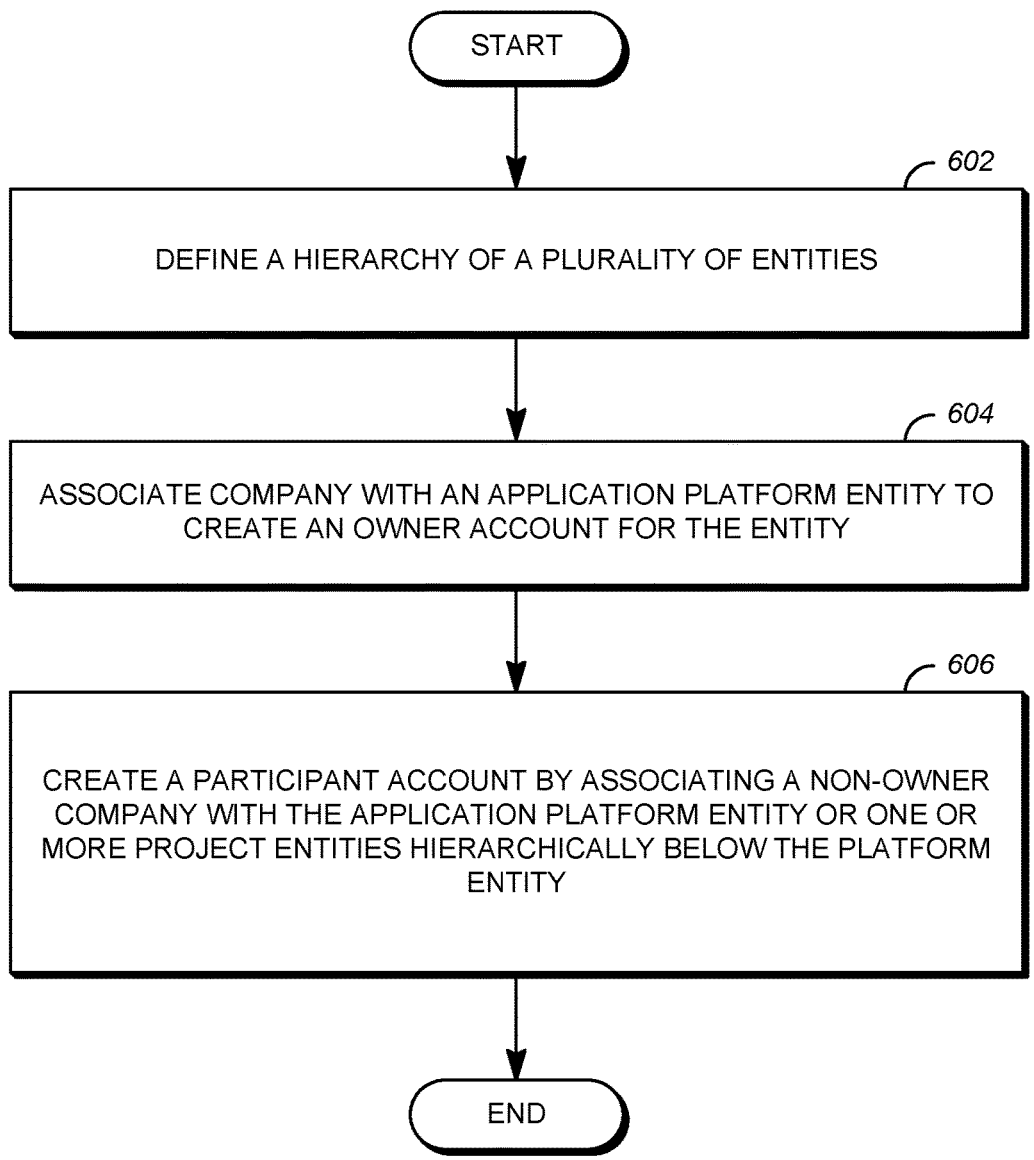
FIG. 6 is a diagram illustrating exemplary operations that can be used to manage the signing of data.

FIG. 6 is a diagram illustrating exemplary operations that can be used to manage the eligibility of signing of data. In block 602, a hierarchy 400 of a plurality of entities are defined, the hierarchy comprising, in decreasing hierarchical order, an application platform entity 402, having a sole owner, at least one project entity 404 for each application platform entity 402, the project entity 404 comprising a device family 460, at least one model entity 406 for each project entity 404, the model entity 406 defining the installation of the data on devices 450 associated with the model entity 406, and at least one configuration entity 408 for each model entity 406, the configuration entity 406 defining the data to be installed on devices 450 associated with the configuration entity 406. Next, eligibility to designate at least one of the plurality of users to access the at least one configuration entity 408 is managed via a plurality of accounts. As described above, the plurality of accounts comprises an owner account of the application platform entity 402, the owner account issued to only the sole owner of the application platform entity 402. The owner account provides sole eligibility to authorize access the application platform entity 402. The owner account also provides eligibility (but not sole eligibility) to permit authorization of access to any of the plurality of entities hierarchically below the application platform entity (including the project entity 404, model entity 406, and configuration entity 408 or entities hierarchically below the application platform entity 402. The plurality of accounts may also comprise at least one participant account of the application platform entity and/or the at least one project entity. The participant account provides eligibility to authorize users from a company which has a participant account to access the at least one configuration entity hierarchically below the application platform entity or the at least one project entity, respectively, to sign the data to be installed on the devices 450 associated with the at least one configuration entity. Thus, as illustrated in blocks 604 and 606 of FIG. 6, such eligibility to designate users to access the configuration entities 408 is performed by associating one company with an application platform entity 402 to create an owner account for that entity, then creating a participant account by associating another (non-owner) company with the application platform entity 402 or one or more project entities 404 hierarchically below the platform entity.

In one embodiment, the owner account provides sole eligibility to designate at least one manager 506 of the at least one model entity 406 hierarchically below the application platform entity 402 to authorize access to all configuration entities 408 hierarchically below the at least one model entity 406 to sign the data to be installed on the devices associated with the configuration entities below the at least one model entity 506. Further, the at least one manager 506 can authorize access to all of the configuration entities 408 hierarchically below the at least one model entity 406 to only users that are associated with the owner account of the application platform entity 402 hierarchically above the model entity 506 or the participant account of the application platform entity 402 hierarchically above the model entity 506.

Use Cases

FIGS. 7-10 are diagrams illustrating selective use application cases of the OCSS 100.

Figure 7:
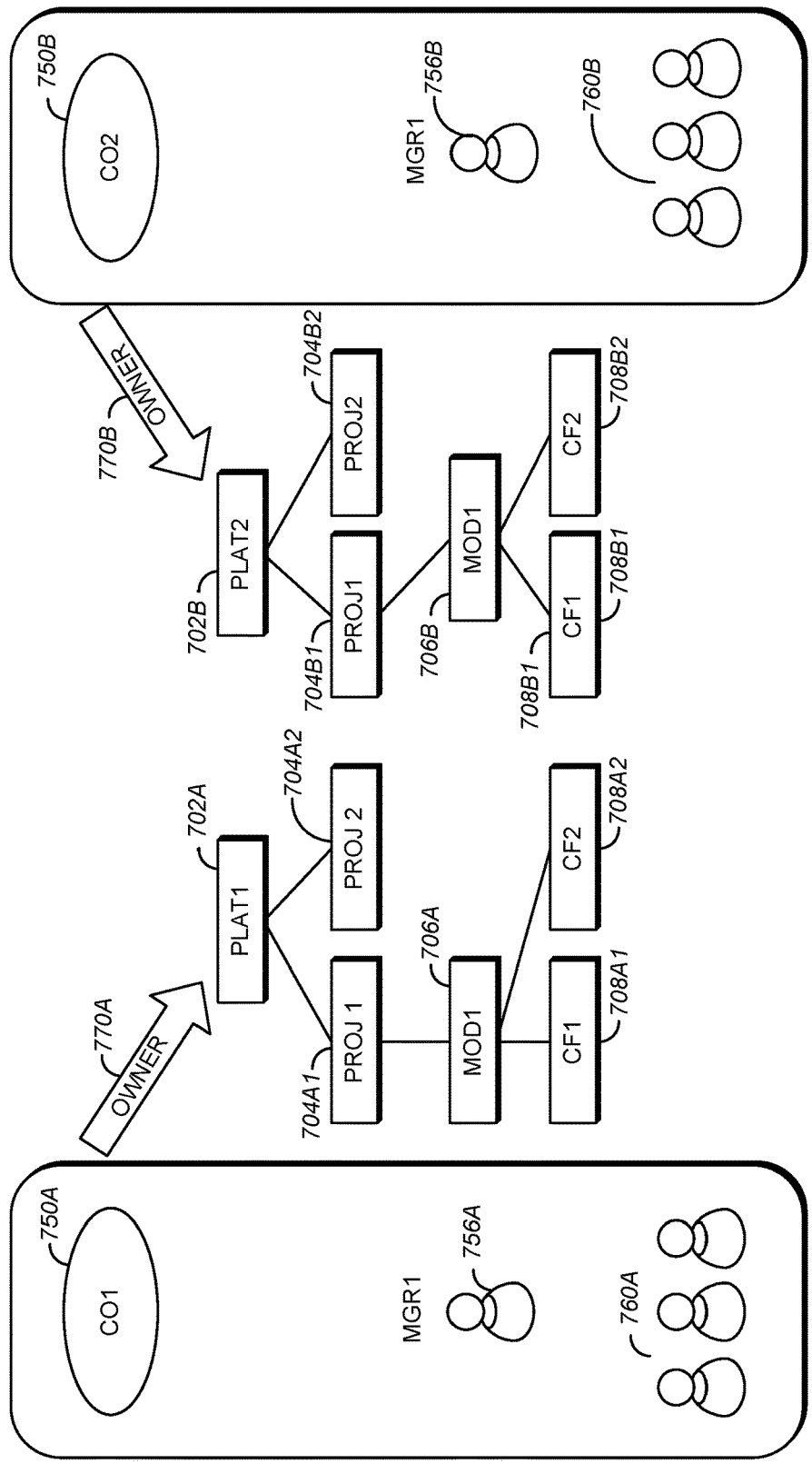
FIG. 7-10 are diagrams illustrating selective use application cases of the OCSS.

FIG. 7 is a diagram illustrating a first use application case of the OCSS 100. In this embodiment, a first company 750A would like only its users to be able to sign data to be installed on its own devices, and a second company 750B would like to do the same with respect to its own devices.

The OCSS administrator defines a hierarchy of a plurality of entities for each company 750A and 750B as follows. For the first company 750A, application platform entity 702A is defined with the first company 750A as the sole owner. Project entity 704A1 associated with the family of devices is created hierarchically below platform entity 702A. Other project entities 704A2 may also be defined. Model entity 706A hierarchically below project entity 704A1 is defined, and configuration entity 708A1 is also defined to be hierarchically below model entity 706A. Other configuration entities 708A2 may also be created.

For the second company 750B, application platform entity 702B is defined with the second company 750B as the sole owner. Project entity 704B1 associated with the family of devices is created hierarchically below platform entity 702B. Other project entities 704B2 may also be defined. Model entity 706B hierarchically below project entity 704B1 is defined, and configuration entity 708B1 is also defined to be hierarchically below model entity 706B. Other configuration entities 708B2 may also be created.

The OCSS administrator manages the eligibility to designate users to sign data to be installed on the devices by use of a plurality of accounts as follows. The OCSS administrator creates an owner account 770A associated with the application platform entity 702A for the first company 750A (sole owners of the application platform entity 702A). The OCSS administrator also creates an owner account 770B associated with application platform entity 702B for the second company 750B (sole owners of the application platform entity 702B). The OCSS administrator grants the created owner account 770A to the first company 750A and owner account 770B to the second company 750B. Since each company 750 has elected to manage the signing of data for their own devices and not enable other companies to manage of signing of data for their devices, no participant accounts have been created or granted to either the first company 750A or the second company 750B.

Next, a manager 756A of the model entity 706A hierarchically below a project entity 704A1 of the application platform entity 702A is assigned. That manager 756A authorizes users 760A associated with the model entity 706A being managed by the manager 756A to sign the data being installed on the devices associated with the configuration entities 708A1 and 708A2 hierarchically below the model entity 706A. Managers can assign users to the entities they manage by entering data unique to the user into the OCSS 100, for example, the user's email address.

Similarly, a manager 756B of the model entity 706B hierarchically below the project entity 704B1 of the application platform entity 702B is assigned. That manager 756B authorizes users 760B associated with the model entity 706B being managed by the manager 756B to sign the data being installed on the devices associated with the configuration entities 708B1 and 708B2 hierarchically below the model entity 706B.

So configured, the OCSS 100 allows users 760A associated with the first company 750A to sign data for use by devices of the device family associated with the model entity 706A, but not users 760B associated with the second company 750B. Similarly, the OCSS 100 thus allows users 760B associated with the second company 750B to sign data for use by devices of the device family associated with the model entity 706B, but not users 760A associated with second company 750A.

Figure 8:
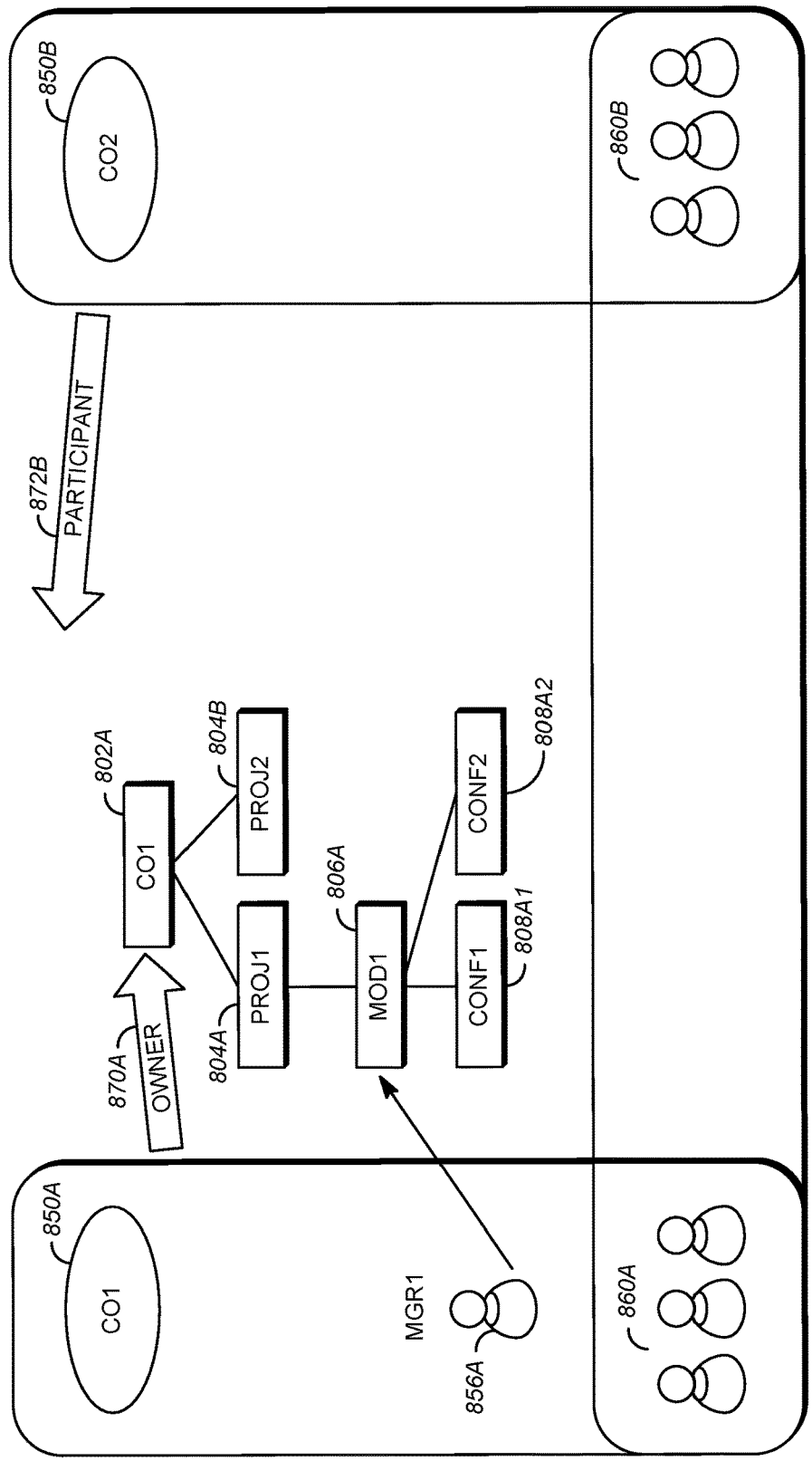

FIG. 8 is a diagram illustrating a second use application case of the OCSS 100. In this embodiment, first company 850A would like to allow its users to sign data to be installed on devices belonging to one of its device families, and would like to allow users from a second company 850B to sign data to be installed on the devices of the same device family.

The OCSS administrator defines a hierarchy of a plurality of entities for company 850A as follows. For the first company 850A, application platform entity 802A is defined with the first company 850A as the sole owner. Project entity 804A1 associated with the family of devices is created hierarchically below platform entity 802A. Other project entities 804A2 may also be defined. Model entity 806A hierarchically below project entity 804A1 is defined, and configuration entity 808A1 is also defined to be hierarchically below model entity 806A. Other configuration entities 808A2 may also be created.

Second company 850B would like to be entitled to allow its users 860B (e.g. employees or agents) to sign data that is to be installed on the devices of the family of devices associated with first project entity 804A. In this embodiment, first company 850A is a first business organization that is the sole owner of the application platform entity 802A, and second company 850B is a second business organization independent from the first business organization.

To accomplish this, the OCSS administrator creates an owner account 870A associated with the application platform entity 802A for the first company 850A (sole owners of the application platform entity 802A). A manager 856A of the model entity 806A hierarchically below the project entity 804A1 of the application platform entity 802A is assigned. This manager 856A authorizes users 860A of the first company 850A associated with the model entity 806A being managed by the manager 856A to sign the data to be installed on the devices associated with the configuration entities 808A1 and 808A2 hierarchically below the model entity 806A.

Since first company 850A has elected to manage the signing of data for their own devices and also to enable users associated with the second company 850B to sign data for the first company's devices, the OCSS administrator also creates a participant account 872B and grants the participant account 872B to the second company 850B.

The created participant account 872B may be associated with at least one of the application platform entity 802A or at least one of the project entities 804A and 804B. For example, the OCSS administrator can create a participant account 872A associated with the application platform entity 802A (which enables access to the application platform entity 802A and all entities hierarchically below the application platform entity 802A including the project entities 804A and 804B). This option makes it easier for OCSS administrators to manage future projects under the application platform, because eligibility to manage all project entities under the application platform entity is automatically provided in the participant account. Or, the OCSS administrator can create a participant account 872B associated with the project entity 804B of the device family of interest (which enables access to the project entity 804B and all entities hierarchically below the project entity 804B). This option provides tighter control, as eligibility for new projects under the application platform are not automatically granted by inheritance from the application platform entity, but instead must be granted to each project. This provides finer resolution control over eligibility, but requires the OCSS administrator to define a participant account for each project with a desired eligibility independent from the other projects.

In the illustrated embodiment, the participant account 872B that is created and granted is associated with the application platform entity 802A.

A manager 856A for the model entity 806A has already been assigned, so this assigned manager 856A authorizes users 860B associated with the participant account 872B to sign the data to be installed on the devices associated with the configuration entities 808A1 and 808A2 hierarchically below the manager's model entity 806A. Thus, the objective of the first company 850A allowing users 860B of the second company to sign data that is to be installed on the devices of the family of devices associated with first project entity 804A is achieved.

Figure 9:
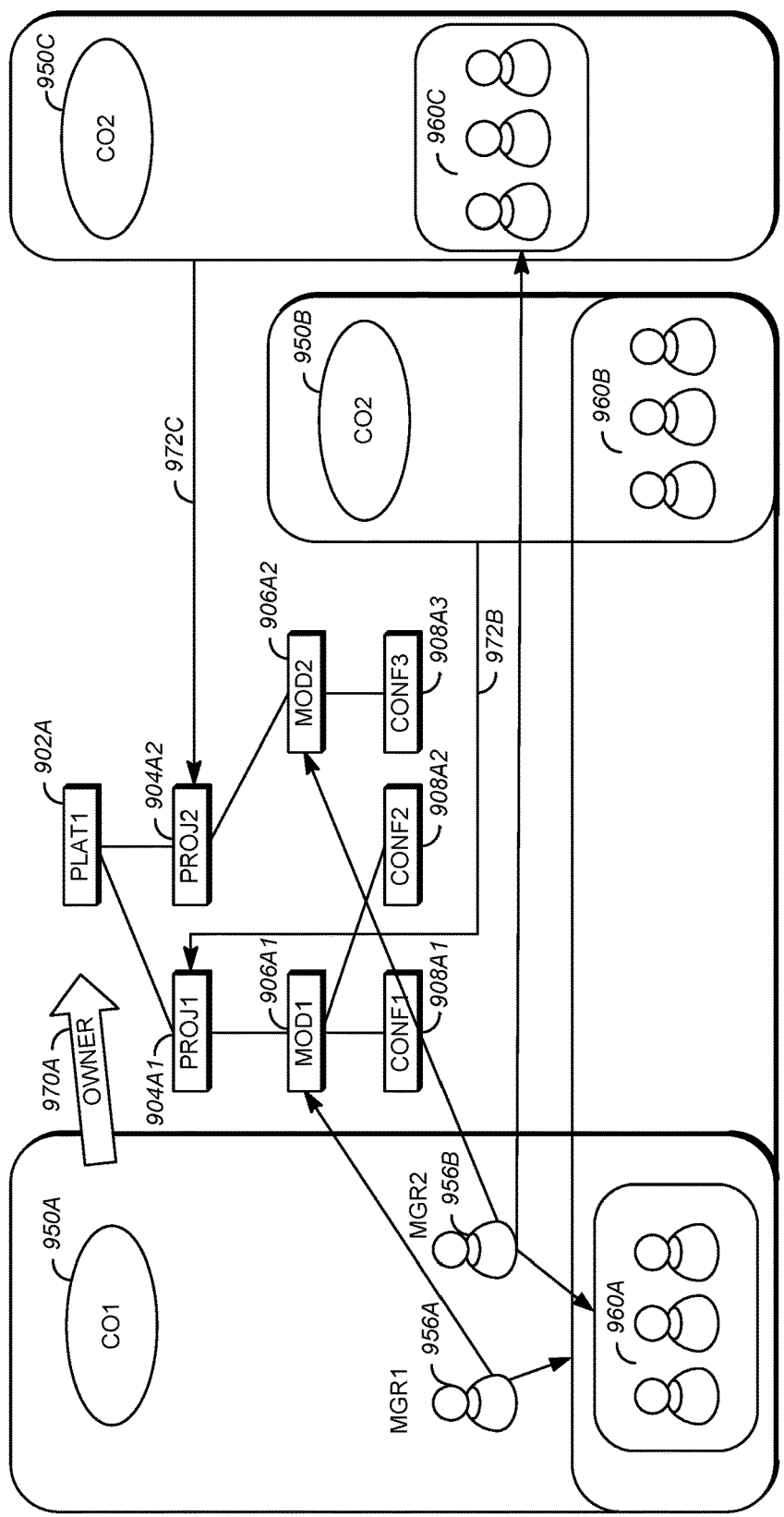

FIG. 9 is a diagram illustrating a third use application case of the OCSS 100. In this embodiment, a first company 950A is a sole owner of application platform entity 902A, and would like other companies to be able to sign data for use in it's devices. Further, first company 950A has two families of devices, and would like the users of a first company 950B to be able to sign data to be installed on only devices belonging to the first family of devices, and users of a second company 950C to be able to sign data to be installed only devices belonging to the second family of devices.

The OCSS administrator defines a hierarchy of a plurality of entities as follows. A application platform entity 902A is defined with the first company 950A as the sole owner. A first project entity 904A1 and a second project entity 904A2 are defined hierarchically below platform entity 902A, each representing a family of devices. The definition of two project entities 904A1 and 904A2 allows each to be separately managed so that only users of companies having a participant account associated with the project entities are eligible to be granted permission to sign data to be installed on devices of the device family associated with the project entity. This is further described below.

The OCSS administer further defines the hierarchy such that model entity 906A1 is hierarchically below project entity 904A1, and is the only such model entity hierarchically below project entity 904A1. Further, the hierarchy is defined such that model entity 906A1 includes configuration entities 908A1 and 908A2. Similarly, the OCSS administrator defines a second model entity 906A2 to be hierarchically below project entity 904A1. Further, model entity 906A2 includes only one configuration entity 908A3.

Hence, in the defined hierarchy, the platform entity 902A includes a first project entity 904A1, hierarchically above a first model entity 906A1, which is hierarchically above a first configuration entity 908A1 and second configuration entity 908A2. So that the eligibility to sign data to be installed on different families of devices can be separately managed, the hierarchy is also defined to include a second project entity 904A2 hierarchically below the platform entity 902A, which is hierarchically above a second model entity 906A2, which in turn is hierarchically above a third configuration entity 908A3.

First company 950A would like to allow users 960B from second company 950B to sign data used with devices associated with the first project entity 904A1 (e.g. devices in the device family associated with first project entity 904A1), and to allow users 960C from third company 950C to sign data used with devices associated with the second project entity 904A2 (e.g. devices in the device family associated with first project entity 904A1. In this embodiment, first company 950A is a first business organization that is the sole owner of the application platform entity 902A, and second company 950B and third company 950C are second and third business organization, respectively independent from the first business organization.

To implement the foregoing eligibilities and permissions, the OCSS administrator creates an owner account 970A associated with the application platform entity 902A for the first company 950A (sole owners of the application platform entity 902A). Managers are assigned for each model entity hierarchically below the application platform entity 902A. In the illustrated embodiment, a first manager 956A is assigned for model entity 906A1, and a second manger 956B is assigned for model entity 906A1.

Participant accounts are created. Since the owner of the project entity 902A would like the second company 950B and the third company 950C to be able to sign devices, but only allow users from the second company 950B to sign data for use in devices associated with the first project entity 904A1 (and not the second project entity 904A2), and only allow users from the third company 950C to sign data for use in devices associated with the second project entity 904A2 (and not the first project entity 904A1), two separate participant accounts are created, with each participant associated with a different project entity instead of creating a single participant account associated with the application platform entity 902A hierarchically above both project entity 904A1 and project entity 904A2. Referring to the embodiment illustrated in FIG. 9, a participant account 972B associated with project entity 904A1 is created for the second company 950B and a participant account 972C associated with project entity 904A2 is created for the third company 950C.

The first manger 956A then authorizes users 960B associated with the first participant account 972B and no other participant accounts (users associated with the owner account 970A may also be authorized) to sign the data to be installed on the devices of the device families associated with the configuration entities 908A1 an 908A2 hierarchically below the model entity 906A1 managed by the first manger 956A. Importantly, the first manger 956A is not enabled to authorize users 960C of the second participant account 972C to sign the data, because first manger 956A has not been designated by the first company 950A which has the owner account 970A as a manager of any of the model entities 906A2 hierarchically below project entity 904A2. Because the first manager 956A does not manage any of the model entities 906A2 hierarchically below project entity 904A2, the first manager 956A will not be presented with an interface that enables designation of users that include users 960C. Similarly, the second manager 956B authorizes users 960C associated with the second participant account 972C and no other participant accounts to sign the data to be installed on the devices associated with configuration entity 908A3. The second manager 956B is likewise not enabled to authorize users 960B of the second participant account 972B to sign the data, because second manger 956B has not been designated by the first company 950A which has the owner account 970A as a manager of any of the model entities 906A1 hierarchically below project entity 904A1. Because the second manager 956B does not manage any of the model entities 906A1 hierarchically below project entity 904A1, the second manager 956B will not be presented with an interface that enables designation of users that include users 960B.

As a result, first manager 956A has authorized users 960A (of the first company 950A) and users 960B (of the second company 950B) to sign data that is to be installed on devices of the model entity 706A1, including configuration entities 908A1 and 908A2. Further, second manager 956B has authorized users 960A (of the first company 950A) and users 960C (of third company 950C) to sign data that is to be installed on devices of the model entity 706A1, including configuration entity 908A3.

Figure 10:
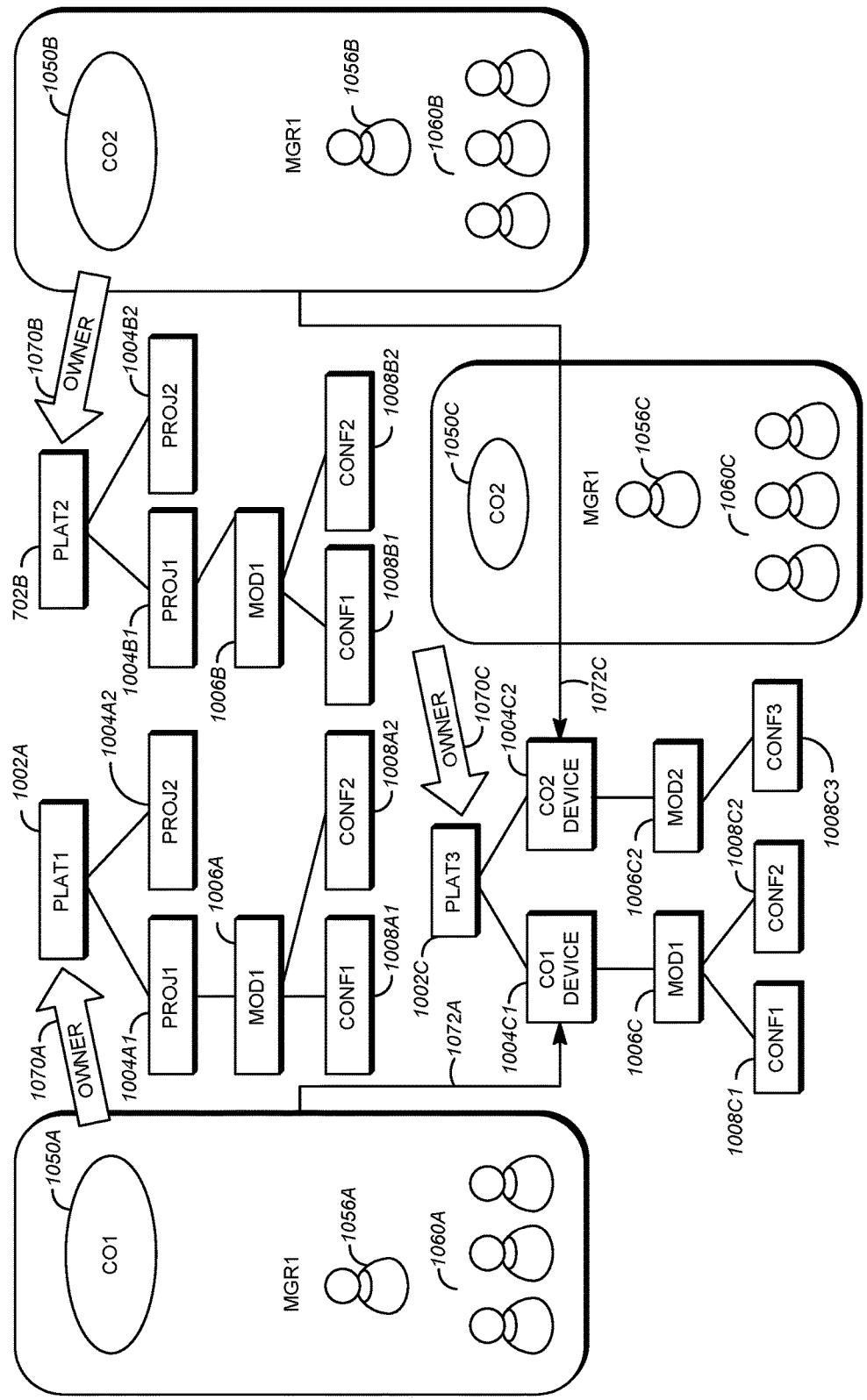

FIG. 10 is a diagram illustrating a fourth use application case of the OCSS 100. In this embodiment, a first company 1050A produces a first family of devices, and second company 1050B (independent from first company 1050A) produces a second family of devices. A third company 1050C (also independent from first company 1050A and second company 1050B) would like to source devices used to provide broadcast media services from first company 1050A and second company 1050B, and would like to allow the users of first company 1050 to sign data to be installed on the device family of the first company 1050A but not the second company 1050B, and would like the users of second company 1050B to be able to sign data to be installed on the device family of the second company 1050B, but not the first company 1050A.

To achieve these goals, the OCSS administrator defines a hierarchy of a plurality of entities. First company 1050A is defined the sole owner of application platform entity 1002A, and second company 1050B is defined the sole owner of application platform entity 1002B, and hierarchies of entities are defined below these application platform entities as described in FIG. 10. That is, two project entities 1004A1 and 1004A2 are defined to be hierarchically below platform entity 1002A, each representing a family of devices. Model entity 1006A is defined to be hierarchically below project entity 1004A1, and is the only such model entity hierarchically below project entity 1004A1. Model entity 1006A is also defined to be hierarchically above configuration entities 1008A1 and 1008A2. Hence, the hierarchy is defined such that platform entity 1002A is hierarchically above a first project entity 1004A1, which is hierarchically above a first model entity 1006A1, which is in turn hierarchically above the first configuration entity 1008A1 and second configuration entity 1008A2. The hierarchy may also be defined such that platform entity 1002A also includes a second project entity 1004A2, however, second project entity 1004A2 does not have any model entities or configuration entities.

Also in this embodiment, there are two project entities 1004B1 and 1004B2 hierarchically below platform entity 1002B, each representing a family of devices. Model entity 1006B is hierarchically below project entity 1004B1, and is the only such model entity hierarchically below project entity 1004B1. Model entity 1006B includes configuration entity 1008B1 and 1008B2. Hence, the platform entity 1002B includes a first project entity 1004B1, which includes a first model entity 1006B1, which includes a first configuration entity 1008B1 and second configuration entity 1008B2. Platform entity 1002B also includes a second project entity 1004B2, however, second project entity 1004B2 does not have any model entities or configuration entities.

This embodiment also includes a third company 1050C that would like for devices from first company 1050A and second company 1050B to be used with their application platform 1002C, but would like the control the authorization of users to sign data to be installed on those devices, even though the devices are produced by first company 1050A and second company 1050B, and not third company 1050C.

To accomplish this, the OCSS administrator defines application platform entity 1002C, with third company 1050C as the sole owner. Further, a first project entity 1004C1 and a second project entity 1004C2 are defined to be hierarchically below the third company's application platform entity 1002C, with the first project entity 1004C1 associated with the family of devices from the first company 1050A. A model entity 1006C1 is defined to be hierarchically below platform entity 1004C1, and hierarchically above configuration entities 1008C1 and 1008C2. Another model entity 1006C2 is defined to be hierarchically below platform entity 1004C1, and hierarchically above configuration entities 1008C3.

To implement the foregoing eligibilities and permissions, the OCSS administrator creates an owner account 1070C associated with the application platform entity 1002C for the third company 1050C (sole owners of the application platform entity 1050C). By assigning an owner account to the third company 1050C, the third company 1050C is eligible to enable its users 1060C to access any of the hierarchical entities below the application platform entity 1002C, including project entities 1004C1 (for the device family sourced by the first company 1050A) and 1004C2 (for the device family sourced by the second company 1050B). At least one manager 1056C is then assigned for at least the model entities 1006C1 and 1006C2 hierarchically below the project entities 1004C1 and 1004C2 are assigned for each model entity hierarchically below the application platform entity 1002C. In the illustrated embodiment, a first manager 1056C is assigned for model entity 1006C and model entity 1004C2. The assigned manager 1056C is then eligible to authorize users 1060C of the third company 1050C to sign the data to be installed on the devices associated with the configuration entities 1008C1 and 1008C2 hierarchically below model entity 1006C1 (and project entity 1004C1) as well as any devices below model entity 1006C2 (and project entity 1004C2).

Since third company 1050C would like to allow users 1060A from the first company 1050A to sign data to be installed on devices of the device family associated with project entity 1004C1 and to allow users 1060B to sign data to be installed on devices of the device family associated with project entity 1004C2, the OCSS administrator also creates participation accounts 1072A and 1072B associated with project entities 1004C1 and 1004C2, respectively. Participation account 1072A is granted to the first company 1050A and participation account 1072C is granted to the second company 1050B.

Manager 1056C is the manager of the model entities of interest (model entity 1006C1 and model entity 1006C2), and manager 1056C authorizes users 1060A associated with the first company 1050A to sign data that is to be installed on devices in the device family associated with model entity 1006C1 below project entity 1004C1. Manager 1056C also authorizes users 1060B associated with the second company 1050B to sign data that is to be installed on devices in the device family associated with model entity 1006C2 below project entity 1004C2.

Of course, since the OCSS administrator has granted the first company 1050A an owner account for application platform 1002A, a manager 1056A may be assigned to model entity 1006A, granting eligibility of the manager 1056A to allow users 1060A of the first company 1050A to sign data to be installed on devices in the family of devices associated with project entity 1004A1. But since second company 1050B and third company 1050C have not been granted participant accounts associated with application platform entity 1002A or project entity 1004A1, manager 1056A is not eligible to grant users 1060B and 1060C from second company 1050B and third company 1050C respectively permission to sign data that is to be installed on devices of the family of devices associated with project entity 1004A1. Similarly, since the OCSS administrator has granted the second company 1050B an owner account for application platform 1002B, a manager 1056B may be assigned to model entity 1006B, granting eligibility of the manager 1056B to allow users 1060B of the second company 1050B to sign data to be installed on devices in the family of devices associated with project entity 1004B1. But since first company 1050A and third company 1050C have not been granted participant accounts associated with application platform entity 1002B or project entity 1004B1, manager 1056B is not eligible to grant users 1060A and 1060C from first company 1050A and third company 1050C respectively permission to sign data that is to be installed on devices of the family of devices associated with project entity 1004A1.

As a result, manager 1056C may authorize users 1060A (of the first company 1050A) to sign data that is to be installed on devices of the model entity 1006C1, including configuration entities 1008C1 and 1008C2, and users 1060B (of the second company 1050B) to sign data that is to be installed on devices of the model entity 1006C2, including configuration entities 1008C3.

Based on the above description for FIGS. 7-10, the OCSS 100 provides flexibility for a company to define and to participate in various code signing service structures according to different access control needs and business requirements/agreements with other companies.

Implementation Options

As described above, the OCSS 100 may be implemented in embodiments wherein processing operations are allocated between an OCSS frontend 102 and an OCSS backend 104 communicatively coupled to the OCSS frontend 102. In such embodiments, the OCSS frontend 102 controls access to the OCSS backend 104, and the OCSS backend 104 is used to define hierarchies of entities and to manage the eligibility to designate users to access the entities described above.

In such embodiments, the OCSS backend 104 may be used to enforce sole eligibility to authorize access to the application platform entities, eligibility to permit authorization of access to any of the plurality of entities hierarchically below each of the application platform entities, eligibility to authorize users associated with the owner account to access to access the configuration entities hierarchically below the application platform entities to sign the data to be installed on the devices associated with the configuration entities, and to authorize users associated with participant accounts to access the configuration entities hierarchically below the entity to which the participation account is granted. The OCSS backend 104 also performs the cryptographic operations needed to sign the data to be installed on the devices.

The OCSS frontend 102 executes a presentation layer to present user interfaces that allow the OCSS administrator to define hierarchies of entities and to manage eligibility for data signing using owner and participant accounts, and also controls access to the OCSS backend 104. The presentation layer may provide an account setup page, a user registration page, an access request page, and a system access form page. The access request page shows the OCSS 100 hierarchy in the form of a tree down to the model entity level for users from company having the owner account to request additional permissions. The system access form allows users associated with the OCSS administrator's organization to request access to the OCSS 100. The presentation layer may also present a user interface for adding new users, as permitted only by OCSS administrators, a user interface for managing user permissions (using email addresses or other identifiers to find users and their associated account to verify eligibility for those users to access certain hierarchical entities), and for managing configuration permissions, and a configuration user interface that allows OCSS administrators to set up and update application platform, project, model and configuration entities, assign owners of those entities, and to define the hierarchy of those entities.

Hardware Environment

Figure 11:
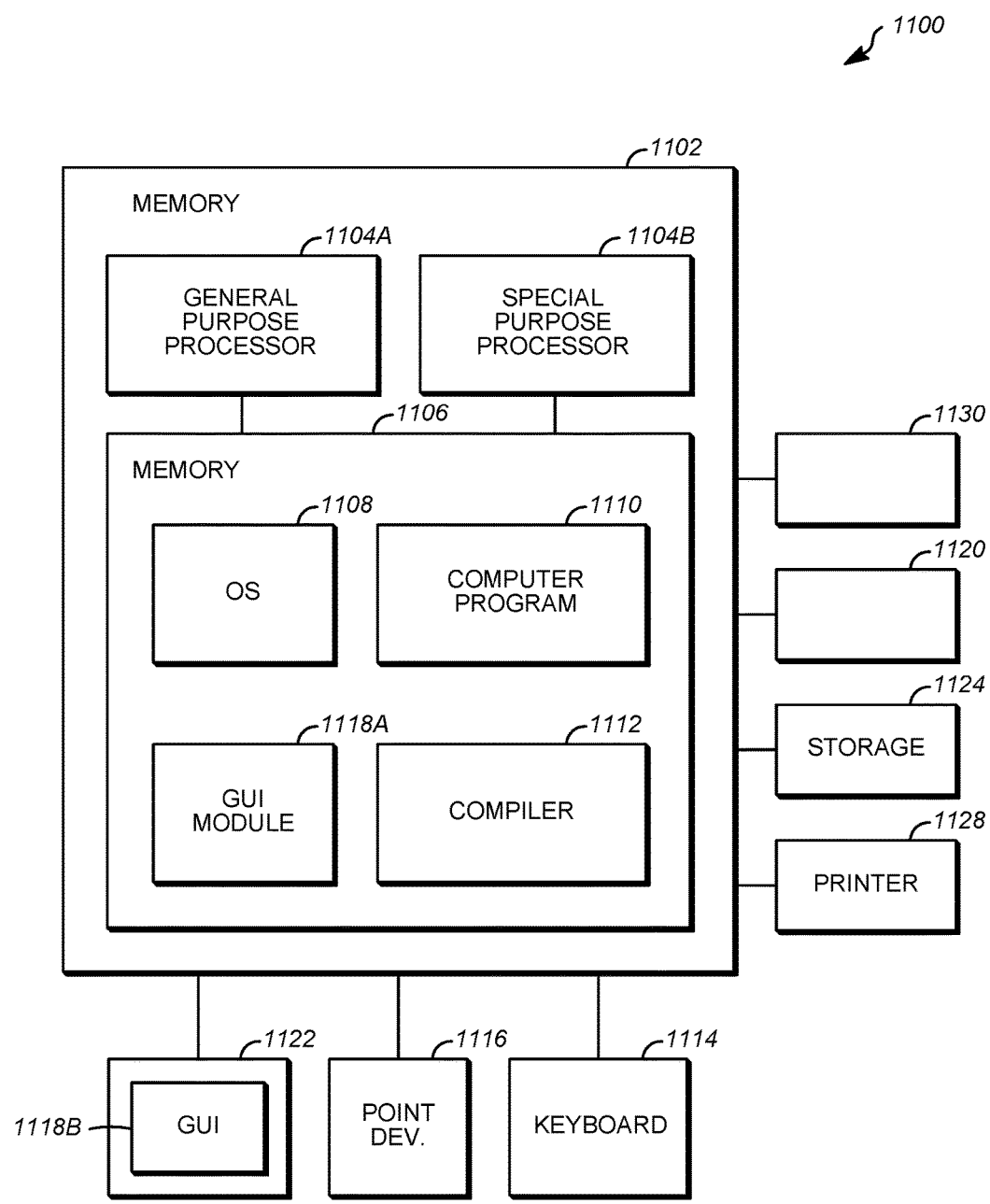
FIG. 11 is a diagram illustrating an exemplary computer system that could be used to implement elements of the OCSS.

FIG. 11 is a diagram illustrating an exemplary computer system 1100 that could be used to implement elements of the present invention, including the OCSS frontend 102, OCSS backend 104, firewalls 110 and 112, HSM 116, database 114, LDAP server 120, and user computer 108. The computer 1102 comprises a general purpose hardware processor 1104A and/or a special purpose hardware processor 1104B (hereinafter alternatively collectively referred to as processor 1104) and a memory 1106, such as random access memory (RAM). The computer 1102 may be coupled to other devices, including input/output (I/O) devices such as a keyboard 1114, a mouse device 1116 and a printer 1128.

In one embodiment, the computer 1102 operates by the general purpose processor 1104A performing instructions defined by the computer program 1110 under control of an operating system 1108. The computer program 1110 and/or the operating system 1108 may be stored in the memory 1106 and may interface with the user and/or other devices to accept input and commands and, based on such input and commands and the instructions defined by the computer program 1110 and operating system 1108 to provide output and results.

Output/results may be presented on the display 1122 or provided to another device for presentation or further processing or action. In one embodiment, the display 1122 comprises a liquid crystal display (LCD) having a plurality of separately addressable pixels formed by liquid crystals. Each pixel of the display 1122 changes to an opaque or translucent state to form a part of the image on the display in response to the data or information generated by the processor 1104 from the application of the instructions of the computer program 1110 and/or operating system 1108 to the input and commands. Other display 1122 types also include picture elements that change state in order to create the image presented on the display 1122. The image may be provided through a graphical user interface (GUI) module 1118A. Although the GUI module 1118A is depicted as a separate module, the instructions performing the GUI functions can be resident or distributed in the operating system 1108, the computer program 1110, or implemented with special purpose memory and processors.

Some or all of the operations performed by the computer 1102 according to the computer program 1110 instructions may be implemented in a special purpose processor 1104B. In this embodiment, some or all of the computer program 1110 instructions may be implemented via firmware instructions stored in a read only memory (ROM), a programmable read only memory (PROM) or flash memory within the special purpose processor 1104B or in memory 1106. The special purpose processor 1104B may also be hardwired through circuit design to perform some or all of the operations to implement the present invention. Further, the special purpose processor 1104B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 1102 may also implement a compiler 1112 which allows an application program 1110 written in a programming language such as COBOL, C++, FORTRAN, or other language to be translated into processor 1104 readable code. After completion, the application or computer program 1110 accesses and manipulates data accepted from I/O devices and stored in the memory 1106 of the computer 1102 using the relationships and logic that was generated using the compiler 1112.

The computer 1102 also optionally comprises an external communication device such as a modem, satellite link, Ethernet card, or other device for accepting input from and providing output to other computers.

In one embodiment, instructions implementing the operating system 1108, the computer program 1110, and/or the compiler 1112 are tangibly embodied in a computer-readable medium, e.g., data storage device 1120, which could include one or more fixed or removable data storage devices, such as a zip drive, floppy disc drive 1124, hard drive, CD-ROM drive, tape drive, or a flash drive. Further, the operating system 1108 and the computer program 1110 are comprised of computer program instructions which, when accessed, read and executed by the computer 1102, causes the computer 1102 to perform the steps necessary to implement and/or use the present invention or to load the program of instructions into a memory, thus creating a special purpose data structure causing the computer to operate as a specially programmed computer executing the method steps described herein. Computer program 1110 and/or operating instructions may also be tangibly embodied in memory 1106 and/or data communications devices 1130, thereby making a computer program product or article of manufacture according to the invention. As such, the terms "article of manufacture," "program storage device" and "computer program product" or "computer readable storage device" as used herein are intended to encompass a computer program accessible from any computer readable device or media.

Of course, those skilled in the art will recognize that any combination of the above components, or any number of different components, peripherals, and other devices, may be used with the computer 1102.

Although the term "computer" is referred to herein, it is understood that the computer may include portable devices such as cellphones, portable MP3 players, video game consoles, notebook computers, pocket computers, or any other device with suitable processing, communication, and input/output capability.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching.

It is intended that the scope of the invention be limited not by this detailed description, but rather by the claims appended hereto. The above specification, examples and data provide a complete description of the manufacture and use of the apparatus and method of the invention. Since many embodiments of the invention can be made without departing from the scope of the invention, the invention resides in the claims hereinafter appended.

What is claimed is:

1. A method of managing the signing of data for use with one or more of an plurality of devices of an application platform, each device a member of a device family of the application platform, the data to be installed on the one or more of the plurality of devices according to a management model of the device family, the method comprising:
    defining, by an administrator of the system, a hierarchy of a plurality of entities, the plurality entities comprising, in decreasing hierarchical order:
        an application platform entity that produces the plurality of devices, having a sole owner;
        at least one project entity for each application platform entity, the project entity comprising the device family;
        at least one model entity for each project entity, the model entity defining the installation of the data on devices associated with the model entity; and
        at least one configuration entity for each model entity, the configuration entity defining the data to be installed on devices associated with the configuration entity;
    managing, by an administrator of the system, eligibility to designate at least one of a plurality of users to access the at least one configuration entity to sign the data via a plurality of accounts, the plurality of accounts comprising:
        an owner account of the application platform entity, the owner account issued only to the sole owner of the application platform entity, the owner account providing:
            sole eligibility to authorize access the application platform entity;
            eligibility to permit authorization of access to any of the plurality of entities hierarchically below the application platform entity; and
            eligibility to authorize users associated with the owner account to access at least one configuration entity hierarchically below the application platform entity to sign the data to be installed on the devices associated with the at least one configuration entity;
        at least one participant account of the application platform entity or the at least one project entity, providing:
            eligibility to authorize users associated with the participant account and no other participant account to access at least one configuration entity hierarchically below the application platform entity or the at least one project entity, respectively, to sign the data to be installed on the devices associated with the at least one configuration entity,
    wherein managing eligibility to designate at least one of the plurality of users to access the at least one configuration entity to sign the data via the plurality of accounts comprises:
        creating the owner account associated with the application platform entity for the sole owner of the application platform entity, and
    wherein creating the owner account associated with the application platform entity for the sole owner of the application platform entity comprises:
        assigning the at least one manager of the at least one model entity hierarchically below the application platform entity;
        assigning another manager of another model entity hierarchically below the platform entity;
    the method further comprises:
        creating the at least one participant account, wherein the at least one participant account is associated with the at least one project entity;
        creating another participant account, wherein the another participant account is associated with another project entity;
        authorizing, by the assigned at least one manager, users associated with the at least one participant account and no other participant account to sign the data to be installed on the devices associated with the configuration entities hierarchically below the at least one model entity;
        authorizing, by the assigned another manager, users associated with the another participant account and no other participant account to sign the data to be installed on the devices associated with the configuration entities hierarchically below the another model entity;
    wherein:
        the sole owner of the owner account is a first business organization;
        the at least one participant account is associated with a second business organization independent from the first business organization;
        the another participant account is associated with a third business organization independent from the first business organization and the second business organization.

2. The method of claim 1, wherein:
    the owner account further provides sole eligibility to designate at least one manager of the at least one model entity hierarchically below the application platform entity to authorize access to all configuration entities hierarchically below the at least one model entity to sign the data to be installed on the devices associated with the configuration entities hierarchically below the at least one model entity; and wherein the at least one manager can authorize access to all of the configuration entities hierarchically below the at least one model entity to only users of the plurality of users that are associated with the owner account of the application platform entity hierarchically above the model entity or the participant account of the application platform entity hierarchically above the model entity.

3. The method of claim 1, wherein:

creating the owner account associated with the application platform entity for the sole owner of the application platform entity comprises:

assigning, by an assigned administrator of the system, the at least one manager of the at least one model entity of hierarchically below the application platform entity; and authorizing, by the assigned at least one manager, users associated with the owner account to sign the data to be installed on the devices associated with the configuration entities hierarchically below the model entity.

4. The method of claim 3, wherein managing eligibility to designate at least one of a plurality of users to access the at least one configuration entity to sign the data via a plurality of accounts, further comprises:

creating, by the system administrator, the at least one participant account wherein the participant account is associated with at least one of:
the application platform entity; and
the at least one project entity;

authorizing, by the assigned manager, users associated with the participant account to sign the data to be installed on the devices associated with the configuration entities hierarchically below the model entity;

wherein:
the sole owner of the owner account is a first business organization;
the at least one participant account is associated with a second business organization independent from the first organization.

5. The method of claim 1, wherein:
the system comprises a back end server communicatively coupled to a front end server for controlling access to the back end server;
the defining the hierarchy of the plurality of entities is performed using the back end server accessed by the front end server; and
managing eligibility to designate at least one of a plurality of users to access the at least one configuration entity to sign the data via a plurality of accounts is performed using the backend server accessed by the front end server.

6. The method of claim 1, further comprising:
enforcing, using the backend server, the:
sole eligibility to authorize access the application platform entity; and
eligibility to permit authorization of access to any of the plurality of entities hierarchically below the application platform entity;
eligibility to authorize users associated with the owner account to access at least one configuration entity hierarchically below the application platform entity to sign the data to be installed on the devices associated with the at least one configuration entity;

eligibility to authorize users associated with the participant account to access at least one configuration entity hierarchically below the application platform entity or the at least one project entity, respectively, to sign the data to be installed on the devices associated with the at least one configuration entity;

performing, using the backend server, cryptographic operations to sign the data; and executing, using the front end server, a presentation layer, the presentation layer controlling user access to the backend server.

7. A system managing the signing of data for use with one or more of an plurality of devices of an application platform, each device a member of a device family of the application platform, the data to be installed on the one or more of the plurality of devices according to a management model of the device family, comprising:

a processor; and a memory, communicatively coupled to the processor, the memory storing instructions comprising instructions for:

defining, by an administrator of the system, a hierarchy of a plurality of entities, the plurality entities comprising, in decreasing hierarchical order:
an application platform entity that produces the plurality of devices, having a sole owner;
at least one project entity for each application platform entity, the project entity comprising the device family;
at least one model entity for each project entity, the model entity defining the installation of the data on devices associated with the model entity; and
at least one configuration entity for each model entity, the configuration entity defining the data to be installed on devices associated with the configuration entity;

managing, by an administrator of the system, eligibility to designate at least one of a plurality of users to access the at least one configuration entity to sign the data via a plurality of accounts, the plurality of accounts comprising:
an owner account of the application platform entity, the owner account issued only to the sole owner of the application platform entity, the owner account providing:
sole eligibility to authorize access the application platform entity; and
eligibility to permit authorization of access to any of the plurality of entities hierarchically below the application platform entity;
eligibility to authorize users associated with the owner account to access at least one configuration entity hierarchically below the application platform entity to sign the data to be installed on the devices associated with the at least one configuration entity;
at least one participant account of the application platform entity or the at least one project entity, providing:
eligibility to authorize users associated with the participant account and no other participant account to access at least one configuration entity hierarchically below the application platform entity or the at least one project entity, respectively, to sign the data to be installed on the devices associated with the at least one configuration entity, wherein the instructions for managing eligibility to designate at least one of the plurality of users to access the at least one configuration entity to sign the data via the plurality of accounts comprises instructions for:
 creating the owner account associated with the application platform entity for the sole owner of the application platform entity, and
wherein the instructions for creating the owner account associated with the application platform entity for the sole owner of the application platform entity comprises:
 instructions for assigning, by an assigned administrator of the system, the at least one manager of the at least one model entity of hierarchically below the application platform entity; and
 instructions for authorizing, by the assigned at least one manager, users associated with the owner account to sign the data to be installed on the devices associated with the configuration entities hierarchically below the model entity, and
wherein the instructions for managing eligibility to designate at least one of a plurality of users to access the at least one configuration entity to sign the data via a plurality of accounts, further comprises instructions for:
creating, by the system administrator, the at least one participant account wherein the participant account is associated with at least one of:
 the application platform entity; and
 the at least one project entity;
authorizing, by the assigned manager, users associated with the participant account to sign the data to be installed on the devices associated with the configuration entities hierarchically below the model entity;
wherein:
 the sole owner of the owner account is a first business organization;
 the at least one participant account is associated with a second business organization independent from the first organization.

8. The system of claim 7, wherein:
the owner account further provides sole eligibility to designate at least one manager of the at least one model entity hierarchically below the application platform entity to authorize access to all configuration entities hierarchically below the at least one model entity to sign the data to be installed on the devices associated with the configuration entities hierarchically below the at least one model entity; and
wherein the at least one manager can authorize access to all of the configuration entities hierarchically below the at least one model entity to only users of the plurality of users that are associated with the owner account of the application platform entity hierarchically above the model entity or the participant account of the application platform entity hierarchically above the model entity.

9. A system managing the signing of data for use with one or more of an plurality of devices of an application platform, each device a member of a device family of the application platform, the data to be installed on the one or more of the plurality of devices according to a management model of the device family, comprising:
 a processor; and
 a memory, communicatively coupled to the processor, the memory storing instructions comprising instructions for:

defining, by an administrator of the system, a hierarchy of a plurality of entities, the plurality entities comprising, in decreasing hierarchical order:
 an application platform entity that produces the plurality of devices, having a sole owner;
 at least one project entity for each application platform entity, the project entity comprising the device family;
 at least one model entity for each project entity, the model entity defining the installation of the data on devices associated with the model entity; and
 at least one configuration entity for each model entity, the configuration entity defining the data to be installed on devices associated with the configuration entity;
managing, by an administrator of the system, eligibility to designate at least one of a plurality of users to access the at least one configuration entity to sign the data via a plurality of accounts, the plurality of accounts comprising:
 an owner account of the application platform entity, the owner account issued only to the sole owner of the application platform entity, the owner account providing:
  sole eligibility to authorize access the application platform entity; and
  eligibility to permit authorization of access to any of the plurality of entities hierarchically below the application platform entity;
  eligibility to authorize users associated with the owner account to access at least one configuration entity hierarchically below the application platform entity to sign the data to be installed on the devices associated with the at least one configuration entity;
 at least one participant account of the application platform entity or the at least one project entity, providing:
  eligibility to authorize users associated with the participant account and no other participant account to access at least one configuration entity hierarchically below the application platform entity or the at least one project entity, respectively, to sign the data to be installed on the devices associated with the at least one configuration entity,
wherein the instructions for creating the owner account associated with the application platform entity for the sole owner of the application platform entity comprises instructions for:
 assigning the at least one manager of the at least one model entity hierarchically below the application platform entity;
 assigning another manager of another model entity hierarchically below the platform entity;
 creating the at least one participant account, wherein the at least one participant account is associated with the at least one project entity;
 creating another participant account, wherein the another participant account is associated with another project entity;
 authorizing, by the assigned at least one manager, users associated with the at least one participant account and no other participant account to sign the data to be installed on the devices associated with the configuration entities hierarchically below the at least one model entity;

authorizing, by the assigned another manager, users associated with the another participant account and no other participant account to sign the data to be installed on the devices associated with the configuration entities hierarchically below the another model entity;

wherein:
the sole owner of the owner account is a first business organization;
the at least one participant account is associated with a second business organization independent from the first business organization;
the another participant account is associated with a third business organization independent from the first business organization and the second business organization.

10. The system of claim 7, wherein:
the system comprises a back end server communicatively coupled to a front end server for controlling access to the back end server;
the instructions for defining the hierarchy of the plurality of entities is performed using the back end server accessed by the front end server; and
the instructions for managing eligibility to designate at least one of a plurality of users to access the at least one configuration entity to sign the data via a plurality of accounts is performed using the backend server accessed by the front end server.

11. The system of claim 7, wherein the instructions further comprise instructions for:
enforcing, using the backend server, the:
sole eligibility to authorize access the application platform entity; and
eligibility to permit authorization of access to any of the plurality of entities hierarchically below the application platform entity;
eligibility to authorize users associated with the owner account to access at least one configuration entity hierarchically below the application platform entity to sign the data to be installed on the devices associated with the at least one configuration entity;
eligibility to authorize users associated with the participant account to access at least one configuration entity hierarchically below the application platform entity or the at least one project entity, respectively, to sign the data to be installed on the devices associated with the at least one configuration entity;
performing, using the backend server, cryptographic operations to sign the data; and
executing, using the front end server, a presentation layer, the presentation layer controlling user access to the backend server.

* * * * *